July 10, 1956 M. D NELSON 2,754,363

AUTOMATIC FREQUENCY CONTROL FOR DEFLECTION IN TELEVISION RECEIVERS

Filed Oct. 14, 1952 2 Sheets-Sheet 1

INVENTOR.

Morris D. Nelson

BY [signature]

ATTORNEY

July 10, 1956 M. D. NELSON 2,754,363
AUTOMATIC FREQUENCY CONTROL FOR DEFLECTION IN TELEVISION RECEIVERS
Filed Oct. 14, 1952 2 Sheets-Sheet 2

INVENTOR.
Morris D. Nelson
BY [signature]
ATTORNEY

United States Patent Office 2,754,363

Patented July 10, 1956

2,754,363

AUTOMATIC FREQUENCY CONTROL FOR DEFLECTION IN TELEVISION RECEIVERS

Morris D. Nelson, New York, N. Y., assignor to Radio Corporation of America, a corporation of Delaware Application October 14, 1952, Serial No. 314,590

7 Claims. (Cl. 178—69.5)

Figure 1:
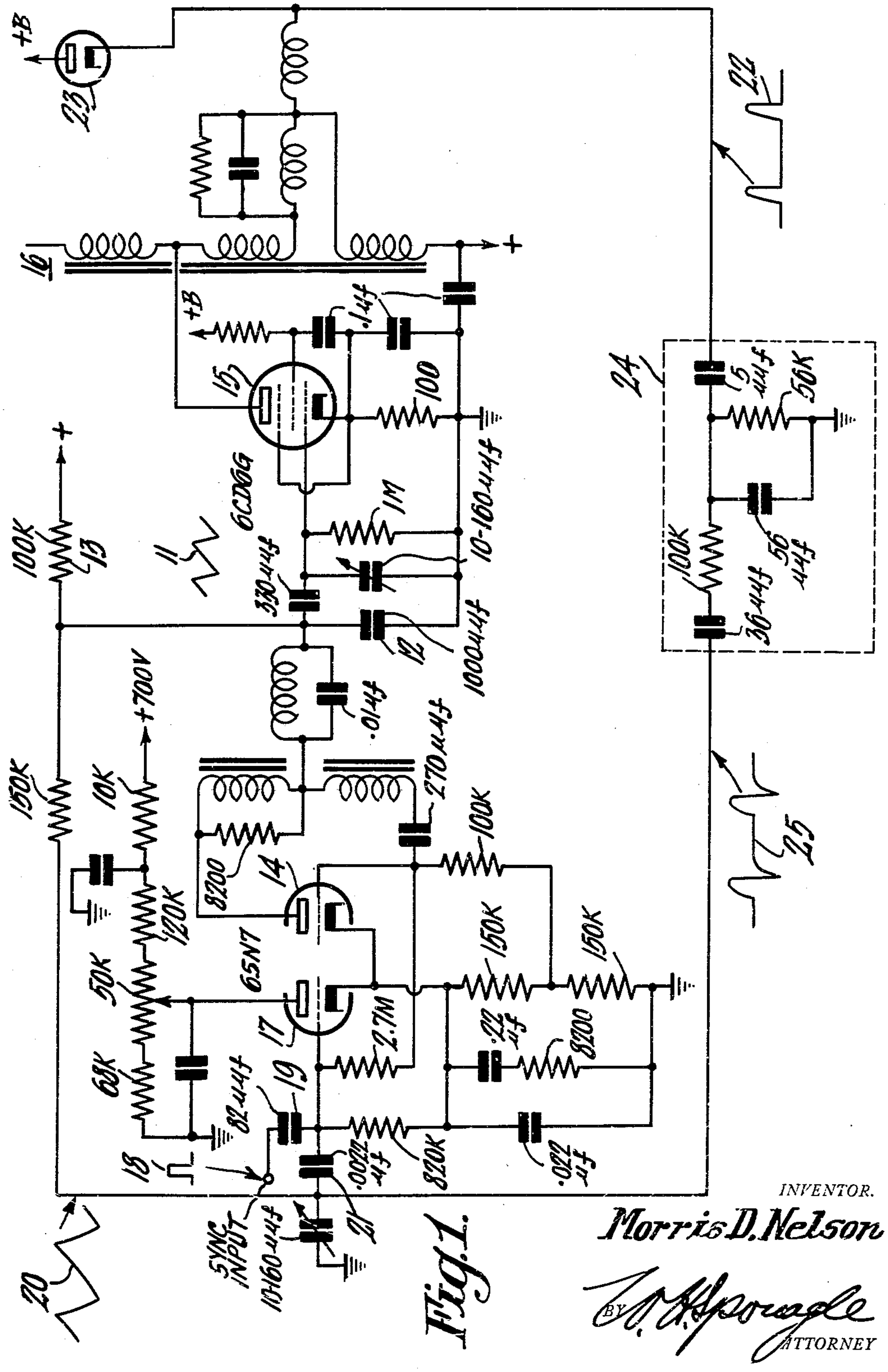

This invention relates to the synchronization of television receivers and particularly to the automatic frequency control of the deflection wave-generating apparatus of such receivers.

In certain types of automatic frequency control systems employed for the synchronization of television receivers, the phasing of the received sync pulses relative to a locally generated beam deflection wave is such that the retrace of the electron beam of the cathode ray image-reproducing device is not completed within the blanking period. In such a case, there is developed a spurious reproduction of a portion of the image displayed by the cathode ray tube which commonly is referred to as "foldover." Foldover, in such a case, occurs in the left hand portion of the reproduced image. It is caused by the video signal-modulation of the electron beam following a blanking interval while the beam is still completing its retrace from right to left, and continuing during the normal trace portions of the beam travel. Such operation causes the reproduction, in the left hand portion of the picture, of image portions resulting from both the end of the retrace and the beginning of the trace portions of the electron beam travel.

In general, it has been proposed to modify a synchronizing system of the character referred to in such a manner as to minimize picture foldover. One proposal of this sort is disclosed in U. S. Patent No. 2,545,346, granted March 13, 1951, to C. R. Edelsohn and titled "Automatic Frequency Control for Television Receivers." In the Edelsohn system, a wave at horizontal beam deflection frequency which is to be phase-compared with received sync pulses is first delayed in time by means such as a delay network so as, in effect, to advance the beam deflection wave relative to the sync pulses sufficiently to cause beam retrace to start earlier in the blanking periods. This enhances the chances of the beam retrace being completed within the blanking period.

A system such as that of Edelsohn requires the use of such apparatus as an artificial line of a character suitable to effect the desired time delay of the entire comparison wave. It is desirable to secure the same beneficial result of picture foldover elimination by somewhat simpler means.

It, therefore, is an object of the present invention to provide an automatic frequency control system for the synchronization of a television receiver with novel, improved and relatively simple facilities for so phasing the received sync pulses, and a locally generated wave to eliminate any foldover of the reproduced image resulting from a failure of the beam to complete its retrace within the blanking periods.

Another object of the invention is to provide a means for so shaping a locally generated wave that its phase relation to the received sync pulses is such that retrace of the electron beam is started early enough in the blanking interval to be completed within such an interval.

Still another object of the invention is to provide an automatic frequency control system for a television receiver wherein the locally generated wave which is employed for frequency comparison with the received sync pulses is effectively so shaped under the control of pulses derived from electron beam deflection circuits to alter the phasing of the compared waves in a manner to insure the completion of electron beam retrace within the blanking intervals.

In accordance with the present invention, there is provided an automatic frequency control system of the general character known commonly as "synchroguide." In such a system a locally generated peak comparison wave is combined with the received sync pulses in such a manner that the sync pulses normally coincide substantially with the peaks of the comparison wave to form a composite wave for frequency control purposes. A control voltage is derived from such a composite wave by means responsive to the changes in the energy content of those portions of the received sync pulses which extend substantially above the peaks of the comparison wave. In such a system, the amplitude of the superimposed sync pulses is made substantially constant. Accordingly, as the phase between the sync pulses and the comparison wave changes, the effective width of the superimposed sync pulses changes, and, consequently, the energy content changes correspondingly.

In the case of a conventionally operated system of the character described, the peaks of the comparison wave, which is used for phase comparison with the received sync pulses, coincide substantially with the beginning of the retrace intervals of the electron beam. Therefore, it is seen that, by reason of the inherent nature of this type of automatic frequency control system, these comparison wave peaks and, consequently, the beginnings of the beam retrace intervals, tend to coincide approximately with the middle of the sync pulses. Thus, beam retrace does not occur until an appreciable time after the beginning of the blanking intervals. It may be seen that, in the case of television receivers in which the retrace interval required by the apparatus used therein is longer than the time remaining in the blanking intervals after the beginning of beam retrace, there is a likelihood that the retrace of the electron beam will not have been completed by the end of the blanking intervals.

Accordingly, the present invention is directed to a means for modifying such a system so that the effective peaks of the wave which is used for phase comparison with the received sync pulses are delayed in time relative to the peaks of the sawtooth wave employed for effecting electron beam deflection and, consequently, also relative to beam retrace. By such means, it may be seen that, with the automatic frequency control system operating in a synchronous condition in which the peaks of the locally generated comparison wave, which is modified in the manner described, coincide substantially with the middle of the received sync pulses, that retrace of the electron beam will have already begun, thereby allowing more time for beam retrace to be completed within the blanking interval.

More particularly in accordance with the present invention, the described modification of the locally generated wave for phase comparison purposes is effected under the control of pulses derived from the deflection wave output circuits. These pulses are generated in substantial coincidence with the retrace of the electron beam. Such pulses are modified so as to produce a positive peak of sufficient amplitude and appropriate shaping for combination with the locally generated comparison wave so as to effectively extend the trace portion of this wave. It also has been found beneficial to shape the derived pulses further to produce a following peak of opposite polarity so as to expedite the retrace portion of the locally generated comparison wave so as to render the automatic frequency control system more effective in initially producing and subsequently maintaining the desired synchronization of the television receiver.

The novel features which are considered characteristic of this invention are set forth with particularity in the appended claims. The invention itself, however, both as to its organization and method of operation, as well as additional objects and advantages thereof, will best be understood from the following description when read in conjunction with the accompanying drawings.

Figure 2:
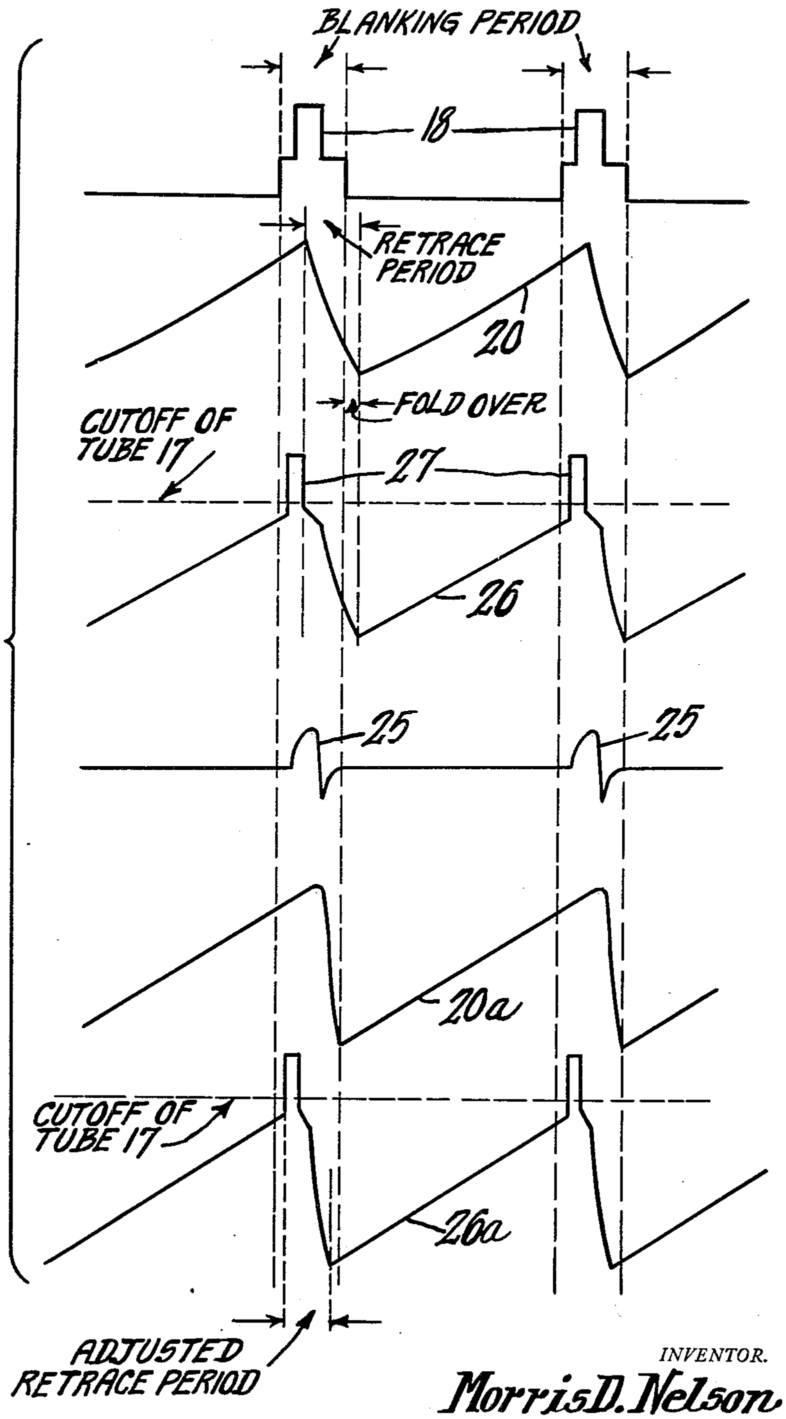

In the drawings:

Figure 1 is a schematic circuit diagram of a television deflection wave synchronizing system embodying the present invention; and, Figure 2 is a group of curves for reference in explaining the operation of the apparatus embodying the invention.

Reference first will be made to Figure 1 of the drawings. The following description will be directed initially to a general description of a television deflection wave synchronizing system of a conventional character, the operation of which may be improved by the incorporation of the present invention which subsequently will be described. Inasmuch as the automatic frequency control system for effecting the desired deflection wave synchrnization is quite extensively used in commercial television receivers and, therefore, is generally known and commonly referred to as synchro-guide, the details of such a system will not be described. In general, a substantially sawtooth driving wave 11 at the horizontal deflection frequency is generated by the alternate charging of a capacitor 12 through a resistor 13 and the discharging of this capacitor through an electron tube 14 which operates as a blocking oscillator. The sawtooth wave is impressed upon a horizontal output amplifier electron tube 15 for the impression of a suitable beam-deflection wave upon the deflection circuit including an output transformer 16.

The frequency of the blocking oscillator tube 14 is controlled by means including a circuit for biasing the control grid of the oscillator tube in response to the output of an electron control tube 17. The control tube 17, in turn, is made jointly responsive to the received sync pulses 18 impressed upon its control grid by means including a coupling capacitor 19, and also to a substatnially sawtooth comparison wave 20 shaped in a manner to be described and derived from the deflection wave generator including the capacitor 12. The re-shaped sawtooth wave 20 is impressed upon the control grid of the bias control tube 17 by means including a coupling capacitor 21.

A circuit of the character described constructed in accordance with the circuit diagram of Figure 1 with the indicated values of the components functions to maintain the desired synchronism between the sawtooth deflection wave 11 and the received sync pulses 18. In general, this synchronization is effected by superimposing the received sync pulses 18 upon the re-shaped substantially sawtooth comparison wave 20 in such a manner that they coincide with the peaks of the sawtooth wave. The control tube 17 is biased so as to be cut off substantially at the peaks of the wave 20. By amplitude-limiting the sync pulses 18 prior to their impression upon the control tube 17, it is seen that phase variations between the sync pulses and the comparison wave 20 result in a width modulation of those portions of the sync pulses 18 which are above the cut off level of the control tube 17. Hence, the energy impressed upon the tube 17 varies in accordance with any phase differences.

The output voltage derived from the cathode of the control tube 17 varies in accordance with the energy input variations and, therefore, also in accordance with the detected phase variations between the received sync pulses and the comparison wave. As indicated, grid bias for the blocking oscillator tube 14 is derived from the cathode of the control tube 17 and, accordingly, varies in response to detected phase differences between the sync signals and the deflection wave to correspondingly vary the operating frequency of the blocking oscillator. Such frequency variations is reflected in the frequency of the deflection wave 11 and also of the comparison wave 20. When the desired synchronization has been effected, a stable condition exists, maintaining the grid bias of the blocking oscillator tube 14 suitable to hold the frequency of the deflection wave equal to the repetition frequency of the received sync pulses.

The synchronizing system in accordance with the present invention includes an additional feature for the purpose of not only effecting the desired synchronization, but also to accomplish it in such a way that retrace of the electron beam is completed entirely within the blanking interval. This additional feature includes a facility for deriving pulses 22 from the deflection circuits during the flyback or retrace periods of the deflection output wave. More particularly, the pulses 22 of positive polarity and of approximately 3500 volts peak-to-peak are derived from the point at which a damper diode electron tube 23 is connected to the winding of the deflection output transformer 16. The positive pulses 22 are impressed upon a differentiation network 24 which is of such a character to produce, in its output circuit, shaped auxiliary timing pulses 25. In general, the differentiation of the pulses 22, by means of the network 24, is such that each of the timing pulses 25 has a positive portion and a negative portion, each of which lasts for approximately one-half of the beam retrace interval. Between the positive and negative portions of the timing pulses there is a relatively rapid transition so as to improve the lock-in stability of the system. The timing pulses 25 are added to the re-shaped phase comparison wave 20 in such a manner as to effectively advance the phase of the deflection wave 11 suitably to enable the beginning of electron beam retrace soon enough in the blanking intervals to insure the completion of it within such intervals. In this manner, the objectionable foldover of the reproduced image at the left hand edge thereof is prevented, and the system is maintained in the desired synchronism with the received sync pulses.

A better understanding of the manner in which the present invention functions to produce the described beneficial result may be had from a consideration of the curves shown in Figure 2, to which reference now will be made. The sync pulses 18 are combined, in a conventional system which does not include the present invention, with the substantially sawtooth comparison wave 20 in such a manner as to form a composite comparison wave 26 for impression upon the input circuit of the control tube 17 so as to compare the phase of the sync pulses and the wave 20 in the manner described. It is seen from the wave 26 that, by suitable choice of the circuit constants, the sync pulses are superimposed substantially symmetrically upon the peaks of the comparison wave 20 when the system is operating in the desired synchronism. Accordingly, it is seen that only the leading portions 27 of the superimposed sync pulses extend beyond the cut off point of the control tube 17 as indicated. The trailing portions of the superimposed sync pulses fall below the cut off point along the relatively steep retrace portions of the wave 26. Also, in the absence of the present invention, the retrace of the electron beam occurs substantially simultaneously with the peaks of the comparison wave 20 as indicated. When the deflection circuits are of a relatively slow beam retrace character, the retrace period extends beyond the blanking period, causing the picture foldover in the manner substantially as described and indicated. It also may be seen from a further consideration of the curve 26 that the beginning of the retrace period does not occur until a time substantially later than the beginning of the blanking period.

Figure 2 also indicates the time relationship of the auxiliary timing pulses 25 formed by differentiation of the flyback pulses 22 relative to the blanking periods. The combination of the timing pulses 25 with the substantially sawtooth comparison wave 20 in the input circuit of the control tube 17, substantially in the manner described, produces a modified comparison wave 20*a*. It is seen by comparing this wave with the unmodified comparison wave 20 that the wave 20*a* produces an effective delay in the formation of the peaks of this wave. Consequently, when the sync pulses 18 are combined with the modified comparison wave 20*a*, there is produced a modified composite wave 26*a* for impression upon the input circuit of the control tube 17. It is seen in this instance that, by reason of the described inherent operation of the synchronizing system, the sync pulses 18 are caused to be superimposed substantially at the peaks of the wave 26*a* in substantially the same manner as in the case of the wave 26. The result of such an operation is to maintain the desired synchronism of the television deflection wave generator, and also to advance in time the deflection wave so that retrace of the electron beam is initiated almost immediately after the beginning of the blanking intervals substantially as indicated with reference to the wave 26*a*. It thus may be seen that retrace is completed within the blanking intervals, thereby obviating the picture foldover previously referred to.

Another beneficial result of the combination of the timing pulses 25 and the comparison wave such as 20 for the production of a modified comparison wave 20*a* is in the steepening of the retrace portions of the wave 20*a*. This result is achieved by virtue of the described relatively rapid transitions of the negative polarity portions of the pulses 25 from the positive pulses thereof as a result of the shaping of the derived pulses 22 by means of the differentiating network 24. The net effect of the rapid transitions of these negative polarity portions of the timing pulses 25 is to produce a materially steeper retrace portion of the composite comparison wave 26*a* than in the corresponding portions of the wave 26. Accordingly, when the sync pulses 18 are impressed upon the peaks of such a modified comparison wave 20*a*, the trailing portions of the superimposed sync pulses are caused to fall below the cut off point of the control tube 17 with such rapidity that the lock-in stability of the synchronizing system is materially improved. The reason for this improvement will be appreciated from the fact that the variations in the energy to which the control tube 17 is responsive are caused primarily by variations in the width of the superimposed sync pulses, and to a much lesser extent by amplitude variations thereof resulting from a less rapid falling off of the trailing portions thereof following the peaks of the comparison wave.

Accordingly, it may be seen from the foregoing description of an illustrative embodiment of the invention that there is provided a comparatively simple and efficiently operating improvement of a synchroguide type of automatic frequency control system for use in effecting the synchronization of the deflection wave generators of a television receiver, whereby to prevent any picture foldover resulting from a failure of the deflection system to complete the retrace of the electron beam during the blanking intervals. Such a facility not only accomplishes the desired elimination of the picture foldover, but also improves the operation of the automatic frequency control system in the manner of providing a greater lock-in stability. Such a beneficial result is achieved by the relatively sharp negative portion of the pulse 25 derived from the differentiation circuit 24. As indicated, this sharp negative pulse portion is effective in steepening the retrace portions of the sawtooth comparison wave 21*a*. Such a steepening of this portion of the wave provides a more positive lock-in of the automatic frequency control system with the received sync pulses.

The nature of the invention may be determined from the foregoing description of an illustrative embodiment thereof. Its scope is pointed out in the appended claims.

What is claimed is:

1. In a television deflection wave synchronizing system in which an electron beam-deflecting wave-generating means is maintained in synchronism with received sync pulses by control means functioning in response to the phase relationship between said sync pulses and the peaks of a comparison wave derived from said wave-generating means, timing apparatus comprising, means effectively coupled to said wave-generating means and responsive to retrace portions of said generated beam-deflecting wave and operative to produce auxiliary pulses each having at least one portion of the same polarity as said comparison wave peaks, said one portion being of short time duration relative to the time intervals between said auxiliary pulses, and means combining said auxiliary pulses and said comparison wave in a manner to effectively delay said comparison wave peaks, whereby to effect an earlier than normal initiation of said electron beam retrace.

2. A television electron beam-deflecting wave synchronizing system comprising, a source of sync pulses, a deflection wave generator, a deflection wave output circuit coupled to said generator, means coupled to said generator producing a peaked comparison wave, frequency control means coupled to said sync pulse source and to said comparison wave-producing means and operative in response to the phase relationship of said sync pulses and of said comparison wave peaks to produce a wave for the frequency control of said generator, means coupled to said deflection wave output circuit and responsive to retrace portions of said deflection wave to develop auxiliary timing pulses each having a portion of the same polarity as said comparison wave peaks, said one portion being of short time duration relative to the time intervals between said auxiliary pulses, and means coupling said timing pulse-developing means to said frequency control means in a manner to combine said timing pulses with said comparison wave so as to effectively delay said comparison wave peaks, whereby to effect an earlier than normal initiation of said deflection wave retrace portions.

3. A synchronizing system as defined in claim 2 wherein, said timing pulse-developing means is of a character to develop timing pulses each having an initial portion of the same polarity as said comparison wave peaks and a subsequent portion of opposite polarity.

4. A synchronizing system is defined in claim 3 wherein, said timing pulse-developing means is of such a character that each of said initial and subsequent timing pulse portions has a time duration of approximately one-half of said deflection wave retrace period and produces a relatively rapid transition between said timing pulse portions.

5. A television electron beam-deflecting wave synchronising system comprising, a source of sync pulses, a deflection wave generator, a deflection wave output circuit coupled to said generator, means coupled to said generator producing a comparison wave having positive polarity peaks, frequency control means coupled to said sync pulse source and to said comparison wave-producing means and operative in response to the phase relationship of said sync pulses and of said comparison wave peaks to produce a wave for the frequency control of said generator, pulse-shaping means coupled to said deflection wave output circuit to develop auxiliary timing pulses having positive polarity portions in response to retrace portions of said deflection wave, each of said positive polarity portions being of short time duration relative to the time intervals between said auxiliary pulses, and means coupling said pulse-shaping means to said frequency control means in a manner to add said timing pulses to said comparison wave peaks so as to produce a composite comparison wave having the peaks thereof effectively delayed, whereby to effect an earlier than normal initiation of said deflection wave retrace portions.

6. A synchronizing system as defined in claim 5 wherein, said pulse-shaping means comprises a differentiating network of a character to develop said timing pulses so that the positive polarity portions thereof have respective time durations equal approximately to one-half of said deflection wave retrace periods.

7. A synchronizing system as defined in claim 6 wherein, said pulse-shaping differentiating network is of a character to develop said timing pulses so as to have additional negative polarity portions following said positive polarity portions with relatively rapid transitions therebetween, said transitions between said positive and negative polarity portions being of such short time durations as to produce sharper than normal retrace portions of said composite comparison wave, whereby to provide a greater synchronizing lock-in stability of said system.

References Cited in the file of this patent

UNITED STATES PATENTS 2,545,346 Edelsohn -------------- Mar. 13, 1951

OTHER REFERENCES

"Rider's Television Manual," vol. 3, GE TV pp. 3–17, Figure 6.

"Rider's TV Manual," vol. 9, pp. 9–37 and 9–48, Sears Roebuck.